Patented Jan. 12, 1937

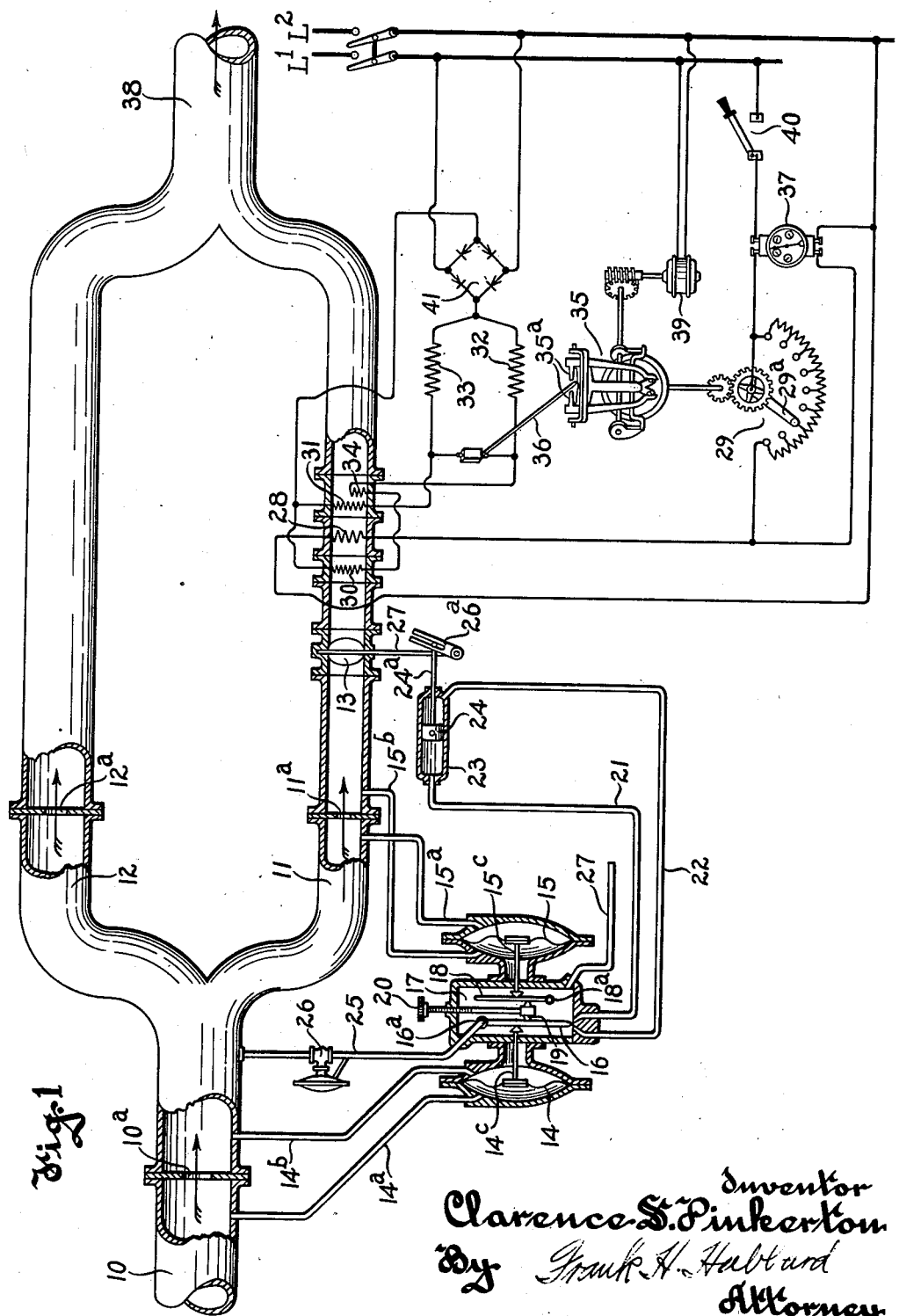

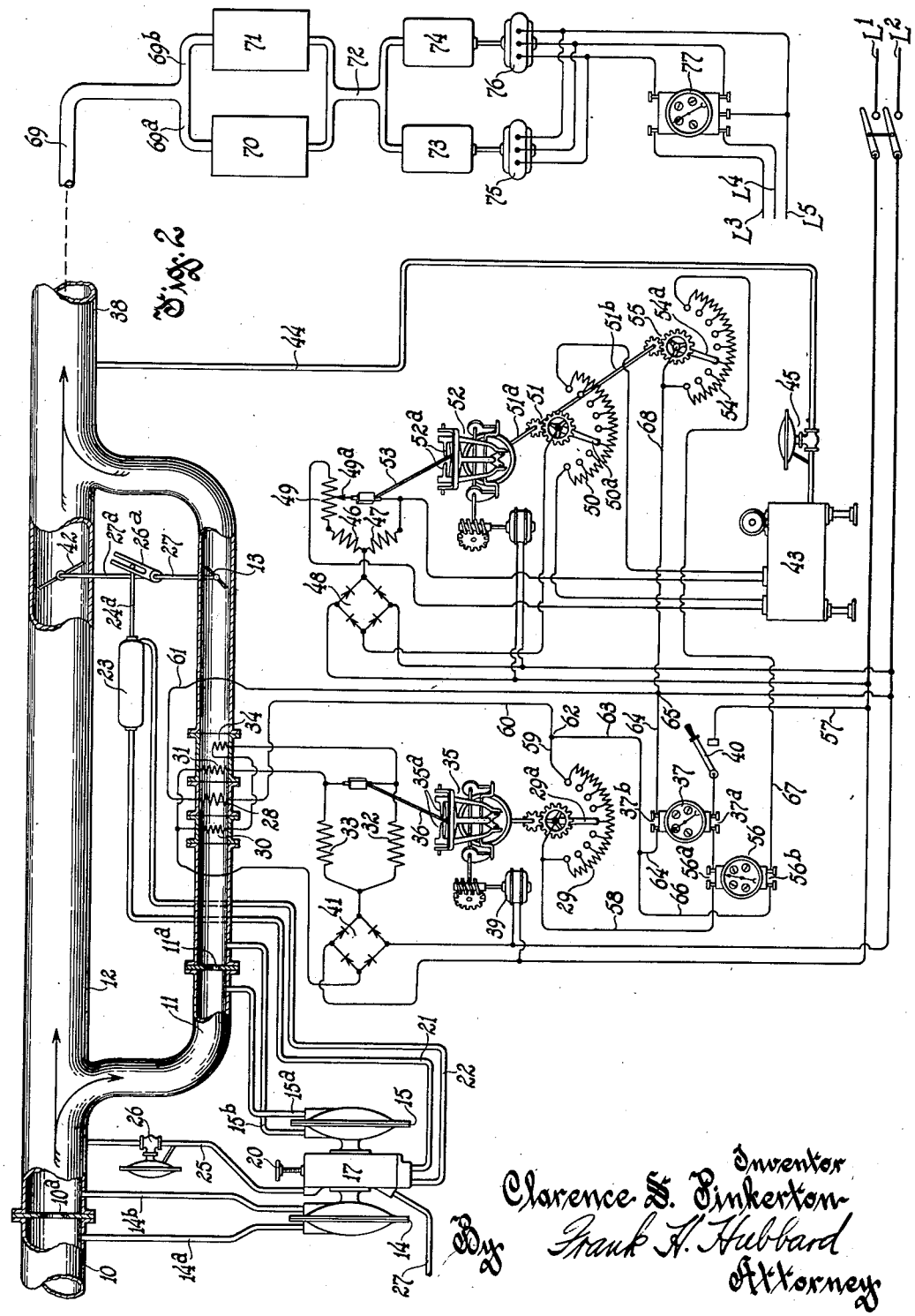

2,067,645

UNITED STATES PATENT OFFICE 2,067,645

APPARATUS FOR MEASURING FLOWING GASEOUS FLUIDS

Clarence S. Pinkerton, Milwaukee, Wis., assignor to Cutler-Hammer, Inc., Milwaukee, Wis., a corporation of Delaware Application October 15, 1934, Serial No. 748,292

8 Claims. (Cl. 73—190)

This invention relates to improvements in apparatus for measuring flowing gaseous fluids.

A primary object of the invention is to provide novel apparatus for accurately measuring large flows of gaseous fluids.

Another object is to provide novel apparatus for fluid flow measurement wherein actual measurement of only a small proportion of the total flow is required.

Another object is to provide novel apparatus of the aforementioned character for measuring the total number of available heat units in a flow of combustible gaseous fluid.

Another and more specific object is to provide novel apparatus for insuring a definite proportionality between a relatively large flow and a relatively small flow of the gaseous fluid, in combination with means for accurately measuring the volume of the small flow to afford an indication of the volume of the entire flow.

Another object is to provide apparatus for accurately measuring a relatively large flow of fluid under conditions of large or violent pulsations in pressure of the fluid and correspondingly large variations in the volumetric rate of flow thereof.

Other objects and advantages of the invention will hereinafter appear.

The accompanying drawings illustrate certain embodiments of the invention which will now be described, it being understood that the embodiments illustrated may be modified as to certain features thereof without departing from the spirit and scope of my invention as defined in the appended claims.

In the drawings, Figure 1 illustrates schematically and diagrammatically a fluid flow metering system as constructed in accordance with my invention, and Fig. 2 illustrates schematically and diagrammatically a fluid flow metering system generally similar to that shown in Fig. 1; said system, however, having co-operatively associated parts to provide for accurate measurement of the total number of available heat units in the entire flow of a combustible gaseous fluid; said system also including means for utilizing the measured flow of combustible gaseous fluid to effect generation of another form of energy, which is also measured for purposes hereinafter described.

Referring first to Fig. 1, the numeral 10 designates a relatively large main conduit through which a fluid is adapted to flow. It may be assumed that a combustible gaseous fluid, such as natural gas, is supplied to conduit 10 in such a large volume as to provide for a flow therethrough at a rate up to 10,000,000 cubic feet per hour. So far as I am aware no practical and economical method or apparatus has heretofore been devised for accurately measuring the volume in standard units of a fluid flow of such magnitude. The well known types of orifice meters are not sufficiently accurate,—particularly where, as in the case of natural gas flows, rather violent pulsations or variations in pressure are likely to occur. Various factors, including the cost, render it undesirable to measure an entire fluid flow of such magnitude by a flow meter of the thermo-electric type. I have found, however, that it is possible to divide the main stream of fluid into two branch streams, one of which branch streams is relatively large and the other of which branch streams is relatively small, and to maintain a predetermined constant volumetric proportionality between the entire flow and one of the branch flows, or, in other words, between the branch flows themselves. The volumetric flow of the relatively small branch stream may of course be accurately measured by a well known form of thermo-electric meter, and said meter may be readily calibrated in accordance with the known proportionality between the two branch streams whereby the same will directly indicate and record or register the volume of the entire flow of fluid.

In carrying out my invention I accordingly provide a relatively small branch conduit 11 and a relatively large branch conduit 12 into which the conduit 10 is adapted to discharge. The conduits 10, 11 and 12 are respectively provided with plates having orifices therein as indicated at 10ᵃ, 11ᵃ and 12ᵃ. Let it be assumed that said conduits and orifices are so proportioned relatively to each other, and with respect to the other elements of the system (such as the heater elements and the valve in the small branch conduit 11) as to normally provide for a flow through conduit 11 of one one-hundredth part of the total fluid flow. However, in order to insure maintenance of the desired volumetric proportionality between the branch flow through conduit 11 and the entire flow through conduit 10 under conditions of wide variations in pressure and rate of flow of the fluid, I prefer to provide a valve 13 which is adjustable automatically to maintain a predetermined proportionality between the values of the pressure drops across orifices 10ᵃ and 11ᵃ, respectively. The means for effecting such automatic adjustment of valve 13 is in general quite similar to that disclosed in the Wünch Patent No. 1,558,529, dated October 27, 1925.

More particularly said means comprises a pair of flexible diaphragms 14 and 15 the outer faces of which are subjected, through piping 14ª, 15ª, respectively, to the pressure conditions on the upstream sides of orifices 10ª and 11ª. The inner faces of diaphragms 14 and 15 are subjected, through piping 14ᵇ, 15ᵇ, respectively, to the pressure conditions on the downstream sides of said orifices 10ª and 11ª. Diaphragm 14 has attached thereto a pin 14ᶜ the free end of which is adapted to bear against a nozzle or jet pipe 16 which is pivoted at 16ª within a chamber 17.

A pin 15ᶜ is attached to diaphragm 15, the free end of said pin being adapted to bear against a lever 18, the lower end of which is pivoted within chamber 17, as indicated at 18ª. Interposed between nozzle 16 and lever 18 is a slide block 19 the longitudinal position of which within chamber 17 is adjustable manually, as by means of the knob 20. A pair of pipes 21 and 22 have their ends opening into chamber 17 in closely adjacent relationship to each other, said pipes having their opposite ends communicating with the opposite ends of a cylinder 23 within which a piston 24 is adapted to slide. Nozzle 16 is connected with a suitable source of fluid under pressure. I have shown the same as connected by pipe 25 with conduit 10 (the fluid pressure in which may be as high as four hundred pounds per square inch), a fluid pressure reducing and regulating valve 26 being interposed in pipe 25 to insure a constant and relatively low (say, three pounds) pressure of the fluid supplied to nozzle 16.

Assuming adjustment of slide block 19 to provide the desired proportionality between the values of the pressure drops across orifices 10ª and 11ª, the parts will act upon variation in such proportionality to move the nozzle 16 in one direction or the other from the intermediate or neutral position thereof illustrated, with consequent corresponding movement of piston 24. Piston 24 is provided with a rod 24ª the hooked end of which slidably engages a slotted arm 26ª attached to the operating shaft 27 of valve 13. By the means aforedescribed the valve 13 is adjusted in such manner as to insure maintenance of a predetermined ratio or proportionality between the values of the pressure drops across orifices 10ª and 11ª, wherefore the volumetric proportionality of the fluid flows through branch conduits 11 and 12 is likewise maintained substantially constant. The excess fluid in chamber 17 is permitted to escape through a pipe 27, which excess fluid may be disposed of in any suitable manner, as by burning the same, or by merely discharging the same to atmosphere.

Inasmuch as a definite and accurate volumetric proportionality may thus be maintained between the relatively small flow through branch conduit 11 and the relatively large flow through branch conduit 12, it is only necessary to provide some means for accurately measuring the volumetric flow through the relatively small conduit 11, and to calibrate such measuring means in accordance with the known proportionality between the two branch flows to afford a definite and accurate measurement of the entire fluid flow.

For this purpose I prefer to employ a so-called Thomas meter substantially of the character disclosed in the Thomas Patent No. 1,222,492, dated April 10, 1917, as modified by the disclosure of the Wilson and Packard Patent No. 1,261,086, dated April 2, 1918. Said meter is located within branch conduit 11 on the downstream side of valve 13, and the same comprises essentially an electric resistance heater 28 adapted to be supplied with current from lines L¹, L². In the illustrated embodiment of my invention it is contemplated that alternating current shall be supplied from said lines; but it is to be understood that a suitable source of direct current may be employed if desired. The rate of current supply to heater 28 is regulable by means of the rheostat 29.

Resistance thermometers 30 and 31 are arranged within conduit 11 for subjection respectively to the temperature of the fluid flowing therein before and after heating thereof by the heater 28. Said resistance thermometers are connected in corresponding branches of a Wheatstone bridge, the other two branches of the bridge comprising fixed resistances 32 and 33. A temperature difference resistance 34 is arranged to be in series with the thermometer resistance 30 under normal working conditions. A known form of ratcheting device 35 is arranged to be controlled through a galvanometer needle 36 acting in conjunction with the clamping elements 35ª of device 35 to vary the adjustment of rheostat 29. A ratcheting device of the character illustrated at 35 is shown and described in detail in Leeds Patent No. 1,125,699, dated Jan. 19, 1935 (see Fig. 1).

Thus so long as the volumetric rate of flow of fluid in the conduit 11 is such as to maintain the Wheatstone bridge in balance no adjustment of rheostat 29 by means of the ratcheting device 35 occurs, but upon variation in rate of flow of the fluid such as to cause unbalancing of the bridge said rheostat is adjusted automatically to vary the current input and the consequent heating effect of the heater 28 to thereby restore the balance of the bridge, all in a manner more fully disclosed in said Thomas patent aforementioned. An integrated indication type watt hour meter 37, having energizing coils connected respectively in series with and in shunt to the heater 28 through that portion of the resistance of rheostat 29 determined by the instantaneous setting of its contactor 29ª, is thus operated in accordance with the volumetric flow of fluid through conduit 11; said watt hour meter 37, however, being calibrated in accordance with the known volumetric proportionality between the fluid flows in branch conduits 11 and 12 to provide for direct indication and registration by the same of the volumetric flow through both of said branch conduits. The branch conduits 11 and 12 are preferably arranged to discharge into a common conduit 38, which is in effect a continuation of the main conduit 10.

The ratcheting mechanism 35 is provided with a continuously operable driving motor 39, which is connected as shown to lines L¹, L². A manually operable switch 40 is adapted to provide for interruption of the current flow through heater 28 to permit balancing of the Wheatstone bridge circuit in a known manner. A rectifier system 41 is interposed between lines L¹, L² and the bridge circuit to provide for the necessary supply of direct current to the latter. While I have shown the branch conduit 12 as being provided with an orifice or restriction 12ª, it is to be understood that in certain installations and under certain conditions such orifice or restriction might be omitted. The use of orifice 12ª is preferable in most instances inasmuch as it tends to provide for simulation in branch conduit 12 of the fluid flow resisting conditions existing in branch conduit 11 as an incident to the presence of orifice 11ª, valve 13, and elements 28, 30, 31 and 34 in the latter.

As aforeindicated the fluid flow proportioning elements are adapted to function to insure an accurate ratio between the volumetric flows in the two branch conduits even though the pulsations in the main flow of fluid become quite violent. Moreover, the thermo-electric flow meter aforedescribed will similarly function accurately regardless of pulsations in the fluid flow, and in a manner to compensate for variations in temperature, pressure and saturation conditions of the fluid. If desired the orifice 10ª in the main conduit 10 might be utilized under certain or favorable conditions in conjunction with a known type of orifice meter device (not shown) to serve as a simple means for checking the fluid flow measurement effected by the aforementioned thermo-electric meter.

In the system illustrated in Fig. 2 certain of the parts may be identical with those aforedescribed and the same have been given like numerals of reference. Thus I have shown a main conduit 10 and small and large branch conduits 11 and 12, respectively, and a conduit 38 into which the branch conduits are adapted to discharge. Main conduit 10 is provided with an orifice 10ª and branch conduit 11 is provided with an orifice 11ª. Conduit 11 is provided with an adjustable valve 13 the operation of which is controlled exactly in the manner aforedescribed by the fluid pressure means which operates in accordance with variations in the differential value of the pressure drops across said orifices 10ª and 11ª, whereby a predetermined volumetric proportionality is maintained between the fluid flows through branch conduits 11 and 12.

In Fig. 2, I have omitted from branch conduit 12 the fixed orifice 12ª shown in Fig. 1. On the other hand I prefer to provide in branch conduit 12 an adjustable valve 42 which is connected to shaft 27 through an extension 27ª to be operated in unison with valve 13. However, the arrangement is preferably such that valve 42 is moved toward its closed position as valve 13 is moved toward its open position, and vice versa. The arrangement aforedescribed provides for automatic maintenance of a very accurate proportionality between the volumetric rates of flow of the gaseous fluid through branch conduits 11 and 12,—the adjustable valve 42 acting in an obvious manner to provide for simulation in branch conduit 12 of the flow resisting conditions in branch conduit 11 incidental to the presence of orifice 11ª, valve 13 and the thermo-electric meter elements.

As shown the thermo-electric meter elements are located within branch conduit 11 between the orifice 11ª and valve 13. Said elements function in co-operation with their associated parts to vary the current input to heater 28 to maintain a constant temperature rise of the fluid between thermometer resistances 30 and 31, whereas the measurement of the current flow to heater 28 by watt hour meter 37 affords an accurate measurement of the volumetric flow through conduit 11. Also as aforedescribed the watt hour meter 37 is calibrated in accordance with the known and maintained proportionality between the volumetric flows of fluid through both conduits 11 and 12 to directly indicate and register the volume (or number of standard cubic feet) of the entire fluid flow.

In many instances it is also desirable to know the total number of heat units supplied by the entire flow of combustible gaseous fluid, and for accomplishment of this result I prefer to employ a known type of calorimeter for ascertaining the total heating value per unit volume of the flowing fluid, such calorimeter being preferably of the character disclosed in the Packard Patent No. 1,625,277, dated April 19, 1927. It is to be understood that another form of calorimeter adapted to effect continuous indication and also to effect the same corrective factors with comparable degrees of accuracy may be substituted if desired.

A calorimeter of the character aforementioned is shown and the same is designated in general by the numeral 43, the same being adapted to withdraw from conduit 38 through pipe 44 and pressure regulating valve 45 a continuous and constant sample of the flowing combustible gaseous fluid. Said calorimeter is provided with a burner (not shown) to which the gas sample is supplied along with combustion air and cooling fluid, also preferably comprising air; said gas sample and cooling fluid being supplied in definitely and continuously proportioned quantities and under like conditions of temperature, pressure and saturation, as described in detail in said Patent No. 1,625,277.

The calorimeter has associated therewith a pair of resistance thermometers (not shown) which are arranged within the cooling fluid chamber of the burner in relations such as to be influenced by the temperature of the cooling fluid before and after absorption thereby of the total heat available through subjection of the test sample of the fluid to the contemplated cycle, that is, in the present case, combustion of the test sample with the combustion air. Said resistance thermometers are connected to form in conjunction with fixed resistances 46 and 47 a Wheatstone bridge, the latter having certain connections, including the rectifier system 48, to provide for electrical energization thereof from the alternating current supply lines L¹, L². The Wheatstone bridge circuit is provided with a resistance element 49 with respect to which the contactor 49ª is adjustable to provide for initially balancing said circuit.

A resistance element 50 is included in circuit between the aforementioned thermometer resistances, whereas connection of this side of the bridge circuit with its source of current supply is effected at an intermediate and variable point of resistance 50, as by means of an adjustable contactor 50ª, the latter being operable through gearing 51 by a shaft 51ª which in turn is adapted to be rotated in opposite directions by a duplex ratcheting mechanism 52 which may be identical with the ratcheting means 35 aforementioned.

A galvanometer having a needle 53 is connected across the Wheatstone bridge as illustrated, said needle serving in conjunction with clamping elements 52ª of mechanism 52 to control the operation of the latter, whereby said mechanism is adapted to vary the position of contactor 50ª and thereby adjust and restore the balance of the Wheatstone bridge following unbalance of the latter due to variation in the total heating value per unit volume of the fluid being tested.

The action of the aforedescribed parts is believed to be sufficiently fully disclosed in said Patent No. 1,625,277, and since such specific features per se constitute no part of the present invention, further description thereof herein is deemed unnecessary, except to state that here as in said Patent No. 1,625,277 the calorimeter described is adapted to measure the total heating value per unit volume of the fluid, as distinguished from the net heating values determined by certain forms of calorimeters which are unadapted to effect certain corrections which are inherent in the operation of the present calorimeter. Further, the movement of shaft $51^a$ may be employed in a manner similar to that described in Patent No. 1,625,277 for effecting indication of either instantaneous or integrated values, or both, of the total heating value per unit volume of the fluid, as by means of a suitably calibrated recorder (not shown).

For present purposes, however, I prefer to provide an additional resistance element 54, the contactor $54^a$ of which is driven, through gearing 55 and an extension $51^b$ of shaft $51^a$, in a manner to simulate exactly the movement of the aforementioned contactor $50^a$. The resistance 54 and contactor $54^a$ are so connected with respect to the source of current supply and with respect to an additional watt hour meter 56 as to indicate and register in the latter the total number of heat units in the entire fluid flow, said meter 56 being calibrated in a known manner for such purpose.

Although the electrical connections for the watt hour meters 37 and 56 are comparatively obvious the same may be described briefly as follows: Considering first the circuit of the series coils of said meters, such circuit may be traced from line $L^1$ by conductor 57 through switch 40 and through said series coils as represented by the terminals $37^a$ and $56^a$, thence by conductor 58 through rheostat 29, by conductors 59 and 60 through heater 28, and by conductor 61 to line $L^2$.

The circuit of the shunt coil $37^b$ of meter 37 may be traced as follows. Beginning at a point 62 between rheostat 29 and the heater 28 in the circuit just traced by conductors 63 and 64 through said shunt coil to a point 65 in said circuit upon the opposite side of the heater. Said shunt coil $37^b$ is thus subjected to influence in accordance with the voltage drop across heater 28, wherefore meter 37 is adapted to function in accordance with the volumetric flow through conduit 11,—and said meter is calibrated in accordance with the aforementioned known proportionality between the branch flows to provide for indication and registration of the volume of the entire flow.

The circuit of shunt coil $56^b$ of meter 56 may be traced as follows. Beginning at the aforementioned point 62, by conductors 63 and 66 through said shunt coil $56^b$ by conductor 67 through that portion of resistance element or rheostat 54 determined by the position of contactor $54^a$, and by conductor 68 to the aforementioned point 65. The connections obviously are such as to produce a shunt arrangement of coil $56^b$ with reference to heater 28, whereby said coil $56^b$ is subjected to influence in accordance with the voltage drop across said heater subject, however, to further influence in accordance with the value of the resistance 54 in circuit, the latter value being, as aforeindicated, a function of the total heating value per unit volume of the flowing gaseous fluid.

The construction and arrangement described thus provide for direct indicating and registering by meter 56 of the total number of available heat units (or B. t. u.'s) in the entire fluid flow, whereas the volume of the entire fluid flow is indicated and registered by the aforedescribed meter 37.

In Fig. 2 I have shown schematically, and on a reduced scale, an arrangement whereby an extension 69 of main conduit 38 is adapted, through its branches $69^a$, $69^b$, to furnish gaseous fluid for combustion within a group or battery of boilers which are designated by the numerals 70 and 71. The steam generated in boilers 70 and 71 may be supplied by tubing 72 to a pair of turbines 73 and 74 which respectively drive a pair of electric generators 75 and 76. Said generators are shown as supplying current to a three-wire circuit represented by lines $L^3$, $L^4$ and $L^5$. A kilowatt hour meter 77 is interposed in a well known manner in said lines $L^3$, $L^4$ and $L^5$ to measure the value of the current produced by the generators 75 and 76. I prefer, however, to have the meter 77 calibrated in a manner to indicate the value of generated current in terms of B. t. u.'s. The readings of meters 77 and 56 may then be directly compared to provide for ascertainment in an obvious manner of the degree of efficiency of operation of the boiler-turbine-generator equipment.

While I have described the systems of Figs. 1 and 2 as providing for a flow through the relatively small branch conduit of one one-hundredth part of the total fluid flow, it is to be understood that for various reasons, such as that of minimizing the cost of any given installation, it may be desirable to standardize upon a single relatively small size of the so-called Thomas thermoelectric fluid meter; say, 100,000 cubic feet per hour capacity, which would be installed in the small branch conduit aforedescribed, and said thermo-electric meter would be calibrated to indicate and register the total gas flow, and the aforedescribed orifices and the additional ratio control equipment would be selected and/or adjusted to give a ratio with the proper multiplier to suit such standardized size of thermo-electric meter.

While I have described my invention as applied to the measurement of a large flow of combustible gaseous fluid, it will be apparent to those skilled in the art that a system of the character disclosed in Fig. 1 is equally well adapted to the measurement of a large flow of air,—such as the flow of cold blast air to be supplied to blast furnaces. Heretofore attempts have been made to measure large flows of cold blast air; but so far as I am aware the prior devices have not been commercially successful, partly due to metering difficulties and partly due to the prohibitive cost of the proposed devices. On the other hand my invention provides for accurate measurement of such large flows of fluid at a minimum cost for the complete equipment.

What I claim as new and desire to secure by Letters Patent is:

1. Apparatus for measuring a large flow of gaseous fluid, which comprises conduits arranged to provide passage for a main stream of fluid and thereafter dividing it into a relatively large branch stream and a relatively small branch stream and for thereafter re-uniting said branch streams, means for utilizing a pressure effect produced in the main conduit and a pressure effect produced in one of the branch conduits to jointly effect control of the volumetric rate of flow in said one of the branch conduits whereby a definite and constant ratio of the volumetric rates of flow in said branch streams is maintained, and means for measuring continuously the volumetric flow of fluid in said small branch stream in a manner to compensate for variations in temperature, pressure and saturation conditions of the fluid, said last mentioned means being calibrated to indicate directly the volumetric flow of fluid in both of said branch streams.

2. Apparatus for measuring the total number of available heat units in a large flow of combustible gaseous fluid, which comprises main and large and small branch conduits arranged to provide passage for a main stream of fluid and thereafter dividing it into a relatively large branch stream and a relatively small branch stream and for thereafter re-uniting said branch streams, means for utilizing a pressure effect produced in the main conduit and a pressure effect produced in the small branch conduit to jointly effect control of the volumetric rate of flow in said last mentioned branch conduit whereby a definite and constant ratio of the volumetric rates of flow in said branch conduits is maintained, means for measuring continuously the volumetric flow of fluid in said small branch conduit in a manner to compensate for variations in temperature, pressure and saturation conditions of the fluid, means for utilizing the measurement aforementioned to indicate directly the volumetric flow of fluid in said branch conduits jointly, means for measuring continuously the total heating value per unit volume of said fluid in a manner to compensate for variations in temperature, pressure and saturation conditions thereof, and means for continuously combining the ascertained value of the volumetric flow of fluid in said branch conduits jointly and the ascertained total heating value per unit volume of said fluid to indicate directly the total number of available heat units flowing in said branch conduits jointly.

3. Apparatus for measuring a large flow of gaseous fluid comprising, in combination, a main conduit having spaced portions through which said fluid is adapted to flow, a pair of branch conduits interposed between and jointly communicating with said portions of the main conduit, one of said branch conduits being relatively large and the other of said branch conduits being relatively small, an adjustable valve located in one of said branch conduits, a constriction formed in the upstream portion of said main conduit and a constriction formed in one of said branch conduits, said constrictions being definitely proportioned in size relatively to each other, means for ascertaining the differential value of the pressure drops across said constrictions, fluid pressure means subject to control by said last mentioned means to automatically effect adjustment of said valve whereby a definite and constant ratio of the volumetric rates of flow through said branch conduits is maintained, a meter of the electro-thermal type located within said relatively small branch conduit and adapted to continuously measure the volumetric flow of fluid through the latter in a manner to compensate for variations in temperature, pressure and saturation conditions of said fluid, said meter being calibrated to indicate directly the volumetric flow of fluid through said branch conduits jointly.

4. Apparatus for measuring the total number of available heat units in a large flow of combustible gaseous fluid comprising, in combination, a main conduit having spaced portions through which said fluid is adapted to flow, a pair of branch conduits interposed between and jointly communicating with said portions of the main conduit, one of said branch conduits being relatively large and the other of said branch conduits being relatively small, an adjustable valve located in one of said branch conduits, a constriction formed in the upstream portion of said main conduit and a constriction formed in one of said branch conduits, said constrictions being definitely proportioned in size relatively to each other, means for ascertaining the differential value of the pressure drops across said constrictions, fluid pressure means subject to control by said last mentioned means to automatically effect adjustment of said valve whereby a definite and constant ratio of the volumetric rates of flow through said branch conduits is maintained, a meter of the electro-thermal type located within said relatively small branch conduit and adapted to continuously measure the volumetric flow of fluid through the latter in a manner to compensate for variations in temperature, pressure and saturation conditions of said fluid, said meter being calibrated to indicate directly the volumetric flow of fluid through said branch conduits jointly, a calorimeter adapted to withdraw and burn a continuous sample of said fluid to ascertain the total heating value per unit volume thereof, said calorimeter being adapted to function in a manner to compensate for variations in temperature, pressure and saturation conditions of said fluid, and electrical means co-ordinated with said meter and said calorimeter and adapted to function continuously and automatically to combine the ascertained value of the volumetric flow of fluid in said branch conduits jointly and the ascertained total heating value per unit volume of said fluid to thereby indicate directly the total number of available heat units flowing through said branch conduits jointly.

5. In a fluid metering system, in combination, a main conduit having spaced portions thereof through which the entire volume of fluid is adapted to flow, a pair of branch conduits communicating at opposite ends thereof with said portions of the main conduit and adapted to jointly accommodate the entire fluid flow, one of said branch conduits being relatively large and the other of said branch conduits being relatively small, the upstream portion of the main conduit and said relatively small branch conduit each having a constriction formed therein, said constrictions being definitely proportioned as to size to normally provide a predetermined ratio between the volumetric rates of flow through said relatively small branch conduit and said main conduit, an adjustable valve located in one of said branch conduits, means for ascertaining the differential value of the pressure drops across said constrictions respectively, fluid pressure means subject to control by said last mentioned means for automatically effecting adjustment of said valve whereby said differential value of the pressure drops is maintained substantially constant, and means including a meter of the thermo-electric type for continuously and accurately measuring the volumetric flow of fluid through said relatively small branch conduit under conditions of relatively large pulsations in the entire flow of fluid and variations in the temperature and/or pressure thereof, said meter being calibrated to indicate and register directly the volume of the entire fluid flow.

6. In a fluid metering system, in combination, a main conduit having spaced portions thereof through which the entire volume of fluid is adapted to flow, a pair of branch conduits communicating at opposite ends thereof with said portions of the main conduit and adapted to jointly accommodate the entire fluid flow, one of said branch conduits being relatively large and the other of said branch conduits being relatively small, the upstream portion of said main conduit and said relatively small branch conduit each having a constriction formed therein, said constrictions being definitely proportioned as to size to normally provide a predetermined ratio between the volumetric rates of flow through said relatively small branch conduit and said main conduit, an adjustable valve located in one of said branch conduits, means for ascertaining the differential value of the pressure drops across said constrictions respectively, fluid pressure means subject to control by said last mentioned means for automatically effecting adjustment of said valve whereby said differential value of the pressure drops is maintained substantially constant, means including a meter of the thermoelectric type for continuously measuring the volumetric flow of fluid through said relatively small branch conduit under conditions of relatively large pulsations in the entire flow of fluid and variations in the temperature and/or pressure thereof, said meter being calibrated to indicate and register directly the volume of the entire fluid flow, means for continuously measuring the total heating value per unit volume of said flowing fluid, said last mentioned means including means to compensate for variations in temperature, pressure and saturation conditions of the fluid, and means for combining the ascertained values of the instantaneous volumetric rate of the entire fluid flow and the total heating value per unit volume thereof, said last mentioned means being calibrated to indicate and register directly the value of the total available heat of the entire fluid flow.

7. In apparatus for continuously measuring and registering the volume of a large flow of gaseous fluid, in combination, a main conduit through the spaced inlet and outlet end portions of which substantially the entire volume of the gaseous fluid is adapted to flow, a pair of branch conduits jointly interposed between and having the inlet and outlet ends thereof respectively connected with the inlet and outlet end portions of said main conduit, said branch conduits being of relatively large and relatively small capacities respectively, the inlet end portions of said main conduit and of said branch conduit of relatively small capacity having orifices respectively arranged therein and normally tending jointly to definitely proportion the volumetric rate of flow through said branch conduit of relatively small capacity with respect to the total flow, means for ascertaining the differential value of the pressure drops across the respective orifices, fluid pressure means controlled by said last mentioned means, an adjustable valve located in said branch conduit of relatively small capacity, said valve being subject to control by said fluid pressure means, whereby the differential value of said pressure drops is maintained substantially constant, and means including an electric fluid meter for ascertaining the volumetric flow of fluid through said conduit of relatively small capacity, said meter being calibrated to indicate and register directly the volume of the total flow of said gaseous fluid.

8. In apparatus for continuously measuring and registering the volume of a large flow of gaseous fluid, in combination, a main conduit through a portion of which the entire volume of the gaseous fluid is adapted to flow, a pair of branch conduits into which said portion of the main conduit is adapted to discharge, said branch conduits being of relatively large and relatively small capacities respectively, said portion of the main conduit and said branch conduit of relatively small capacity having orifices respectively arranged therein and normally tending jointly to definitely proportion the volumetric rate of flow through said branch conduit of relatively small capacity with respect to the total flow, means for ascertaining the differential value of the pressure drops across the respective orifices, fluid pressure means controlled by said last mentioned means, an adjustable valve located in each of said branch conduits, said valves being subject to control jointly by said fluid pressure means, said valves being so arranged as to provide for opening movement of one of the same during closing movement of the other of the same, and vice versa, whereby the differential value of said pressure drops is maintained substantially constant, and means including a thermo-electric fluid meter located within said conduit of relatively small capacity and adapted to compensate in its determinations for variations in temperature, pressure and saturation conditions of said fluid, said meter being calibrated to indicate and register directly the volume of the total flow of said fluid.

CLARENCE S. PINKERTON.